July 7, 1925.                                        1,544,877
L. ARNTZ
SPECTACLE TEMPLE STRUCTURE
Filed Nov. 10, 1924
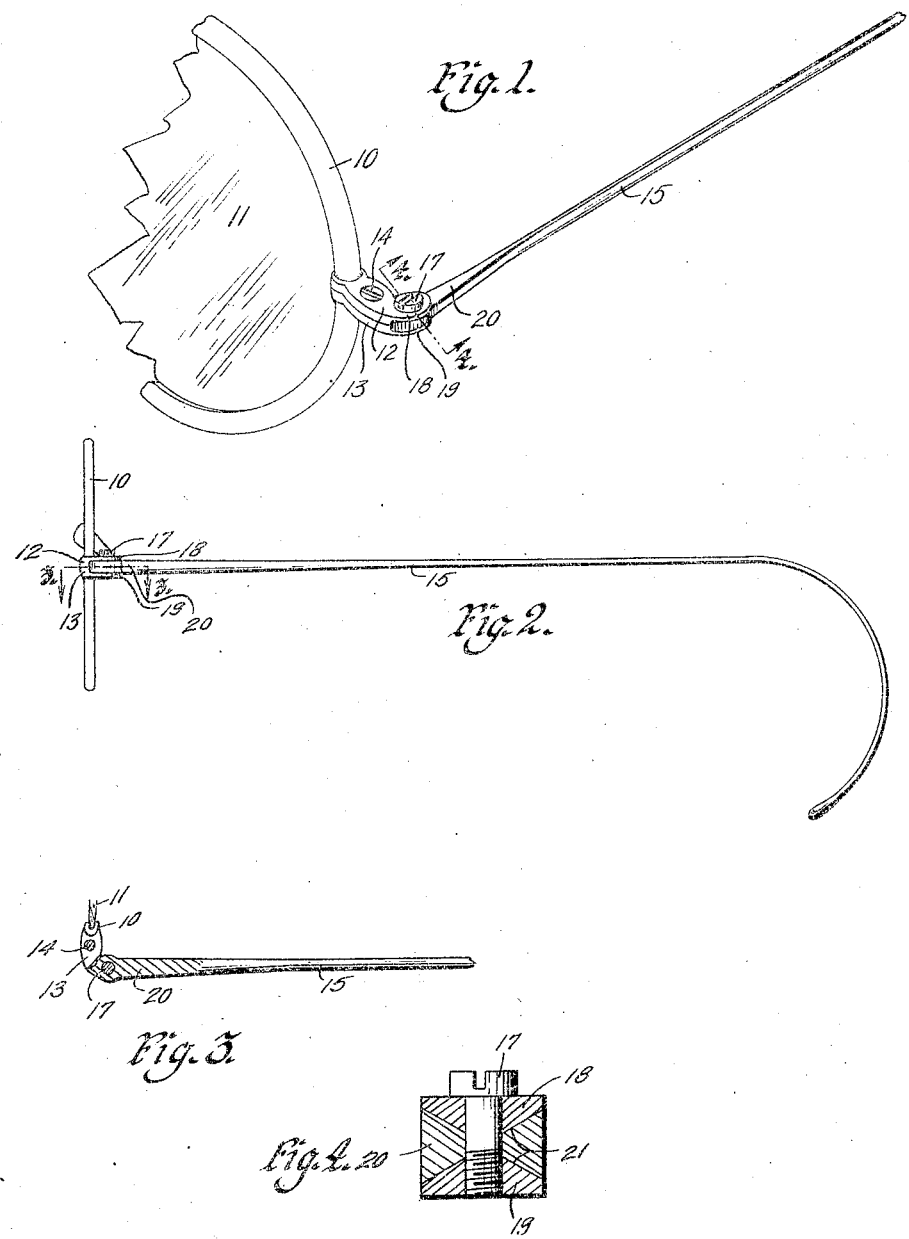

Patented July 7, 1925.

1,544,877

UNITED STATES PATENT OFFICE.

LEW ARNTZ, OF DES MOINES, IOWA.

SPECTACLE-TEMPLE STRUCTURE.

Application filed November 10, 1924. Serial No. 748,997.

*To all whom it may concern:*

Be it known that I, LEW ARNTZ, a citizen of the United States, and a resident of Des Moines, in the county of Polk and State of Iowa, have invented a certain new and useful Spectacle-Temple Structure, of which the following is a specification.

The object of my invention is to provide a spectacle temple structure of extremely simple and inexpensive construction having its parts, however, so arranged as to take from what has been the stronger part of the structure and add to what has been heretofore the weaker part of the structure, so as to produce a finished article, which will have the proper strength adjacent to the hinge joint connection with the rim or eye wire.

With this and other objects in view, my invention consists in the construction, arrangement and combination of the various parts of my invention, whereby the objects contemplated are attained, as hereinafter more fully set forth, pointed out in my claim, and illustrated in the accompanying drawings, in which:

Figure 1 shows a perspective view of a spectacle temple structure embodying my invention.

Figure 2 shows a side elevation of the same.

Figure 3 is a detailed, sectional view taken on the line 3—3 of Figure 2.

Figure 4 is a detailed, sectional view taken on the line 4—4 of Figure 1.

There is a great deal of complaint made to oculists and opticians on account of the fact that the temples of the spectacles break frequently at points close to the hinge joints thereof.

The weakness of the temples at this point results in such frequent breakage as to amount to very substantial loss to spectacle wearers and to afford considerable annoyance for opticians, oculists and optical companies.

It is my purpose to so rearrange the structure of the temple and connecting parts as to do away with the weakness heretofore existing and to afford a strong sturdy structure which will not break as the old structures do.

In the accompanying drawings, I have used the reference numeral 10 to indicate generally the eye glass rim or eye wire containing the lens 11.

The eye wire or rim 10 is ordinarily made in the form of a broken ring.

Secured to the ends of the ring or rim adjacent to the joint therein are the end pieces 12 and 13. A short screw 14 is extended through the upper end piece 12 and screwed into the lower end piece 13 for locking the end pieces and the adjacent ends of the ring 10 together.

To avoid the weakness heretofore referred to, I have therefore provided my structure in which the adjacent faces of the end pieces are made cone-shaped as indicated at 18 and 19 in Figure 4.

The portion of the temple 15 adjacent to the joint, as at 20, is made much thicker than the flat portion 16 and that portion which is received between the cone-shaped portions 18 and 19 of the end pieces is countersunk above and below, as shown at 21, in Figure 4 to fit the cone-shaped portions 18 and 19.

The resulting structure at the joint is of the same vertical thickness overall as in the old structure and of the same horizontal thickness, but the material of the temple itself as at the portion 20 is of almost twice the vertical thickness of the former structures.

This gives a strong rigid temple having more than twice the strength in it adjacent to the joint, which is the weak spot, as is found in the old type of temple structures.

The advantage of such a structure is obvious.

It effects great saving to the user of spectacles and saves the oculist who desires to give his patients real service considerable embarrassment.

Practically all oculists recognize the desirability of securing some structure which will eliminate the weaknesses of the ordinary temple structure. The attempt to meet the difficulty herein referred to is illustrated in the Kirstein and Gage Patent, No. 1,478,661, issued December 25, 1923.

I claim as my invention:

In a structure of the class described, a split lens rim and pieces mounted on the adjacent ends thereof, means for detachably fastening said end pieces together, said end pieces having portions projecting beyond said means spaced from each other and formed with adjacent cone-shaped faces, a temple having pronounced thickness vertically and horizontally and having a portion received between said cone-shaped parts formed with countersunk recesses to receive the cone-shaped parts, and means for locking the cone-shaped parts together with the temple between them for permitting pivotal movement of the temple.

Des Moines, Iowa, November 6, 1924.

LEW ARNTZ.